US006747789B2

(12) United States Patent
Huonker et al.

(10) Patent No.: US 6,747,789 B2
(45) Date of Patent: Jun. 8, 2004

(54) LASER AMPLIFYING SYSTEM

(75) Inventors: Martin Huonker, Zimmern (DE);
Andreas Voss, Schramberg (DE);
Christian Schmitz, Dunningen (DE)

(73) Assignee: Trumpf Laser GmbH + Co. KG, Schramberg (DE)

( * ) Notice: Subject to any disclaimer, the term of this patent is extended or adjusted under 35 U.S.C. 154(b) by 0 days.

(21) Appl. No.: 10/007,651

(22) Filed: Dec. 6, 2001

(65) Prior Publication Data
US 2002/0126373 A1 Sep. 12, 2002

(30) Foreign Application Priority Data
Dec. 9, 2000 (DE) .......................... 100 61 424

(51) Int. Cl.[7] .............. H01S 3/04; H01S 3/042
(52) U.S. Cl. .......... 359/337; 359/343; 372/34; 372/67
(58) Field of Search ............... 359/337, 343; 372/34, 35, 40, 67, 99, 103, 107

(56) References Cited

U.S. PATENT DOCUMENTS

| | | | | |
|---|---|---|---|---|
| 4,245,195 A | * | 1/1981 | Fahlen et al. ............... 372/36 |
| 4,638,486 A | * | 1/1987 | Dost et al. ................... 372/107 |
| 4,815,094 A | * | 3/1989 | Cantoni et al. ............... 372/93 |
| 6,101,201 A | * | 8/2000 | Hargis et al. ................. 372/36 |
| 6,347,109 B1 | * | 2/2002 | Beach et al. | |
| 6,385,220 B1 | * | 5/2002 | Miller et al. .................. 372/34 |

\* cited by examiner

*Primary Examiner*—Nelson Moskowitz
(74) *Attorney, Agent, or Firm*—Barry R. Lipsitz; Douglas M. McAllister (57) ABSTRACT

In order to improve a laser amplifying system, comprising a solid-state member which has flat sides located opposite one another, is of a plate-like design and comprises a laser-active medium, a laser radiation field passing through the solid-state member, a pumping radiation field pumping the laser-active material, a cooling device which absorbs heat from the solid-state member via a first flat side by means of a fluid cooling medium flowing in it, and a reflector for the laser radiation field arranged on the first flat side, of the generic type in such a manner that the solid-state member may be arranged and aligned in as optimum a manner as possible it is suggested that a support with a stable shape be provided for the solid-state member, this support having the laser radiation field passing through it and being transparent for it, that the solid-state member be supported areally on a support surface of the support with a stable shape with its second flat side and be arranged so as to be defined in its shape and position essentially only via the support surface interacting with the second flat side.

40 Claims, 4 Drawing Sheets

LASER AMPLIFYING SYSTEM

The invention relates to a laser amplifying system comprising a solid-state member which is of a plate-like design, has flat sides located opposite one another and comprises a laser-active material, a laser radiation field which passes through the solid-state member, a pumping radiation field pumping the laser-active material, a cooling device which absorbs heat from the solid-state member via a first flat side by means of a fluid cooling medium flowing in it and a reflector for the laser radiation field which is arranged on the first flat side.

A laser amplifying system of this type is known from European patent application 0 632 551.

In the case of such a laser amplifying system, the solid-state member is fixed in position via the first flat side bearing the reflector, wherein it is a problem to fix the solid-state member in a defined manner and aligned in such a manner that optical conditions which are as optimum as possible are present for the propagation of the laser radiation field.

The object underlying the invention is therefore to improve a laser amplifying system of the generic type in such a manner that the solid-state member may be arranged and aligned in as optimum a manner as possible.

This object is accomplished in accordance with the invention, in a laser amplifying system of the type described at the outset, in that a support with a stable shape is provided for the solid-state member, this support having the laser radiation field passing through it and being transparent for it, that the solid-state member is supported areally on a support surface of the support with a stable shape with its second flat side and is arranged so as to be defined in its shape and position essentially only via the support surface interacting with the second flat side.

The advantage of the inventive solution is to be seen in the fact that, with this solution, the cooling may be decoupled from the qualitatively high-standard, optical arrangement of the solid-state member relative to the laser radiation field since the cooling takes place via the second flat side, exactly as known from the state of the art, but the qualitatively high-standard, optical arrangement of the solid-state member is brought about via the second flat side which leads to a dimensionally defined arrangement and at the same time to a positionally defined arrangement of the solid-state member due to the areal support without marginal conditions required for the cooling impairing the shape and position of the solid-state member or being able to affect them as a result.

In this respect, a great advantage of the inventive solution is also to be seen in the fact that negative influences on the optical properties of the solid-state member due to unfavorable mechanical conditions can be avoided as a result of the unilateral predetermination of the shape and the position of the solid-state member.

A particularly favorable solution provides for the first flat side, in the area penetrated by the laser radiation field, to be free from constraining forces predetermined by a surface which is, inherently, mechanically rigid. This solution avoids, in particular, in the area of the solid-state member penetrated by the laser radiation field the build up of mechanical tensions which can, again, negatively influence the optical properties of the solid-state member in the area penetrated by the laser radiation field.

This is of significance, in particular, since an expansion of the solid-state member takes place on account of the heating up of the solid-state member by the pumping radiation field and when the solid-state member is subjected on the first flat side to constraining forces predetermined by a mechanically rigid surface this expansion leads to an impairment of the optical properties of the solid-state member in the area penetrated by the laser radiation field.

In the case of the inventive laser amplifying system there are different possibilities for ensuring that shape and position of the second flat side are clearly predetermined by the support surface of the support.

One advantageous embodiment of the inventive solution provides for the solid-state member to be fixed on the support.

With respect to the fixing between solid-state member and support, the most varied of possibilities are conceivable. For example, it is conceivable to fix the solid-state member on the support at the edges.

A particularly favorable solution provides for the solid-state member to be fixed on the support by a connection effective between the support surface and the second flat side.

Such a connection effective between the support surface and the second flat side may be realized in the most varied of ways.

A particularly favorable solution provides for the connection between the support surface and the second flat side to result due to bonding of support and solid-state member, wherein bonding of support and solid-state member is to be understood as the production of a rigid connection between the solid-state member and the support which can be mechanically stressed.

The provision of a connection between solid-state member and support by bonding has the advantage that no additional material is used which could negatively impair the optical properties of the unit consisting of support and solid-state member.

Another solution provides for the connection between the support surface and the second flat side to be brought about by means of a holding layer. Such a holding layer does have the disadvantage that it possibly leads to an impairment of the optical properties of the unit consisting of support and solid-state member but, on the other hand, it has the advantage that the connection between solid-state member and support may be realized in a simple manner.

In order to optimize the optical properties of the unit consisting of support, solid-state member and holding layer connecting them, it is preferably provided for the holding layer to be adapted with respect to its index of refraction to the index of refraction of the solid-state member.

A particularly favorable solution which, in particular, avoids reflections in the area of the holding layer provides for a difference in the respective indexes of refraction of less than $10^{-2}$ to exist between the holding layer and the support and/or the holding layer and the solid-state member.

Alternatively or in addition to the adjustment of the index of refraction of the holding layer to the support and/or the solid-state member, a further advantageous solution provides for an antireflection layer to be provided between the holding layer and the support.

Furthermore, it is also advantageous when an antireflection layer is provided between the holding layer and the solid-state member.

Alternatively to the provision of a connection effective directly between solid-state member and support, a further, advantageous embodiment provides for the solid-state member and the support to be fixed in a force-locking manner in the area of the support surface and the second flat side as a result of a pressure acting on the solid-state member in the direction of the support. This solution has the advantage that with it the problems which possibly lead to an impairment of the optical properties of the unit consisting of support and solid-state member can be avoided.

A particularly favorable solution provides for the solid-state member to be acted upon with a force in the direction of the support by way of the cooling medium so that the pressure in the cooling medium itself may be used to generate the force, with which a force-locking fixing of the solid-state member on the support is brought about.

Alternatively thereto, another possibility provides for the solid-state member to be acted upon with a force in the direction of the support in sections so that the solid-state member is fixed on the support by way of force locking due to the solid-state member being acted upon partially.

This may be accomplished, for example, in that the solid-state member is acted upon with a force in the direction of the support in an outer area located outside the laser radiation field. In this case, it is possible, for example, to fix the solid-state member on the support by way of mechanical clamping in this outer area, wherein this has the advantage that as a result of the clamping in the outer area of the solid-state member the optical properties thereof in the area penetrated by the laser radiation field are impaired only to a slight degree or insignificantly.

With respect to the optical properties of the solid-state member which can be achieved, it is particularly favorable when the solid-state member acts on the support with essentially the same force at every point with the area of the second flat side bordering on the partial volume penetrated by the laser radiation field so that on account of this essentially homogeneous action of force the forces acting on the solid-state member and thus influencing, where applicable, its optical properties do not cause any inhomogeneities with respect to the optical properties in the partial volume penetrated by the laser radiation field.

Another possibility of abutting the solid-state member on the support surface in a defined manner provides for the solid-state member abutting on the support surface with the second flat side to act on the support, at least with the area of the second support surface bordering on the partial volume penetrated by the laser radiation field, on account of inner tension. This may be realized by means of different solutions.

For example, it would be conceivable to proceed on the basis of a solid-state member with a plane second flat side and to curve the support surface convexly so that the inner tension, with which the solid-state member can be abutted on the support with its area of the support surface bordering on the partial volume penetrated by the laser radiation field on account of the inner tension, results when the plane flat side is placed on the support surface.

Another solution provides for the second flat side to have a convex curvature prior to being abutted on the support surface and an abutment on an essentially plane support surface or one having a smaller convex curvature to be brought about.

With respect to the temperature profile in the solid-state member, no further details have so far been given. One particularly advantageous solution provides for the temperature to be higher at the second flat side than at the first flat side in the areas of the first and second flat sides penetrated by the laser radiation field.

It is particularly favorable when the solid-state member has a temperature gradient extending essentially exclusively transversely to the flat sides in the volume area penetrated by the laser radiation field.

Furthermore, it is also expedient, particularly in order to avoid the formation of any thermal lens, when the solid-state member is essentially free from any temperature gradient in the volume area penetrated by the laser radiation field in the direction of a surface extension in the direction of the flat sides.

Moreover, it is preferably provided for an altogether negative temperature gradient to occur in the solid-state member in a direction extending transversely to the flat sides and extending from the second flat side to the first flat side.

With respect to the discharge of the heat from the solid-state member, no further details have been given in conjunction with the preceding explanations concerning the individual embodiments. It is, for example, preferably provided for the discharge of heat from the solid-state member to take place via a layer system comprising at least one layer applied to the solid-state member.

Such a layer system could, itself, be cooled indirectly. It is particularly favorable when the layer system is acted upon directly by the fluid cooling medium on a side located opposite the flat side.

In order to prevent the layer system, on account of its mechanical properties, from hindering the areal abutment of the second flat side of the solid-state member on the support surface or from thereby leading to mechanical tensions in the solid-state member, it is preferably provided for the discharge of heat from the solid-state member to the fluid cooling medium to take place exclusively via layers consisting of dimensionally flexible materials.

The term dimensionally flexible materials is to be understood such that the rigidity of the layer system is intended to be considerably less than the rigidity of the support and the solid-state member in order not to cause any negative effects.

With respect to the heat conductivity, it is particularly favorable when the layers, via which the discharge of heat from the solid-state member to the fluid cooling medium takes place, to have altogether a heat resistance of at the most 8 K×mm²/W.

With respect to the construction of the layer system, the most varied of possibilities are conceivable.

The simplest possibility provides for the layer system to have a single layer which represents a reflector layer which, for its part, is acted upon directly by the cooling medium on its rear side facing away from the first flat side.

It is, however, even more advantageous when the heat discharge is brought about by the cooling device via a cover layer which is borne by a reflector layer and is acted upon by the fluid cooling medium on a side facing away from the solid-state member.

This cover layer is preferably designed as a protective layer for the reflector layer against action of the cooling medium.

In this respect, the cover layer itself can have the most varied of properties. In this respect, it is particularly favorable when no shape-defining action on the solid-state member takes place via the cover layer, i.e. the mechanical properties of the cover layer have no shape-defining effects on the solid-state member at all.

In this respect, the cover layer is preferably designed as a flexible layer.

In order to avoid, as far as possible, the shape-defining action of the cover layer on the solid-state member, it is preferably provided for the cover layer to be designed as a layer adapting in shape to the shape of the solid-state member.

Another preferred solution provides for the layer system to comprise a membrane which is acted upon by the fluid cooling medium on its side facing away from the solid-state member.

A protection of the solid-state member and of the reflector may be achieved in a particularly simple manner with a membrane of this type.

In this respect, the membrane preferably abuts on a side located opposite the solid-state member on the reflector layer or a cover layer applied to the reflector layer.

With respect to as optimum an integration as possible of support, solid-state member and cooling device it is preferably provided for the solid-state member to limit a chamber guiding the cooling medium with the layer system.

In this respect, it is conceivable for this to be brought about solely by way of the solid-state member with the layer system or also by the combination of the solid-state member with the support supporting the solid-state member in a dimensionally defined manner.

A further, advantageous design provides, in particular, for a layer of the layer system to limit the chamber guiding the cooling medium.

This may be, for example, either the cover layer or the membrane.

Furthermore, it is provided for as advantageous an integration as possible of the arrangement of the solid-state member via the support and the cooling device for the cooling chamber for the cooling medium to be provided in a holder housing of a holder for the support so that the holder for the support also acts at the same time as a cooling device.

A particularly favorable solution provides for the support to close an opening in the holder housing with the solid-state member, wherein a recess which forms the cooling chamber extends proceeding from the opening.

With respect to the design of the material for the support, no further details have so far been given. The support does not serve primarily for cooling the solid-state member. Nevertheless, it is preferably provided, in particular, for the good temperature compensation on the part of the support for the support to be formed from a material with a heat conductivity of less than 2 W/m×K.

A further, advantageous solution provides for the support to be formed from an athermal, optical material, i.e., a material, with which the optical properties are not essentially altered by variations in temperature or temperature gradients since the index of refraction alters with the temperature and the geometry such that the optical properties are essentially not changed.

Since it is not desired within the scope of the inventive solution for the solid-state member to be cooled via the support, it is preferably provided for the support to be essentially thermally insulated in relation to the cooling device.

This may be achieved, for example, by means of insulating spacer members or an insulating layer.

With respect to the structure of support and solid-state member, no further details have so far been given. One advantageous embodiment provides, for example, for the support and the solid-state member to have similar materials forming a crystal grating so that their thermal expansion is as similar as possible and, therefore, no greatly differing heat expansion relative to the support occurs during the heating up of the solid-state member.

With respect to the optical properties of the solid-state member which are as good as possible, it is preferably provided for the flat sides of the solid-state member to be polished so as to be plane-parallel so that, as a result, no negative influence of the laser radiation field during its passage through the flat sides results.

Alternatively thereto, it is preferably provided for the support and the solid-state member to be connected to one another in the area of the second flat side and the support surface and for the first flat side and a front face of the support located opposite the support surface to be polished so as to be plane-parallel in relation to one another so that, in this case, the unit consisting of support and solid-state member has two plane-parallel surfaces which are advantageous for a good beam quality of the laser radiation field.

The support could, in one embodiment, also make contributions to the laser amplifying function, wherein these functional contributions are dominated by those of the laser-active medium.

The material of the support could, for example, have low amplifying properties for the laser radiation field.

In general, the functional contributions of the support are such that the heat input caused by this amounts to less than approximately 10%, even better less than approximately 5%, of the heat input in the laser-active medium.

Further features and advantages of the invention are the subject matter of the following description as well as the drawings illustrating several embodiments. In the drawings.

Figure 1:
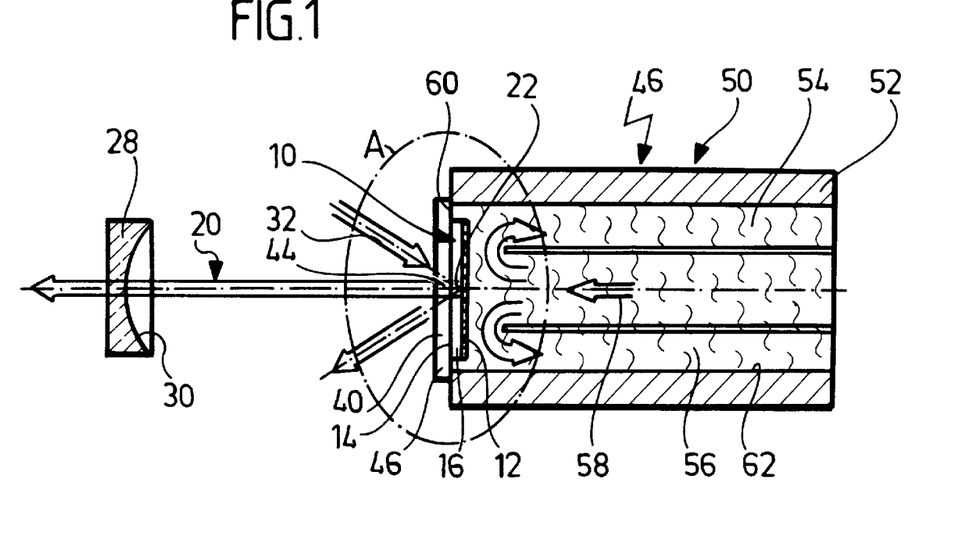
FIG. 1 shows a longitudinal section through a first embodiment of an inventive laser amplifying system.

A first embodiment of an inventive laser amplifying system, illustrated in FIG. 1, comprises a solid-state member which is of a plate-like design, is designated as a whole as 10 and has a first flat side 12, a second flat side 14 located opposite it and a narrow side 16 extending between the flat sides 12 and 14 located opposite one another.

The solid-state member 10 comprises, for its part, a laser-active material, is therefore doped, for example, with a laser-active material.

The solid-state member has a partial volume 22 penetrated by a laser radiation field 20, wherein the laser radiation field 20 is defined, for example, by a resonator comprising two reflectors.

It is, however, also conceivable within the scope of the inventive solution to operate the laser amplifying system without a resonator.

Figure 2:
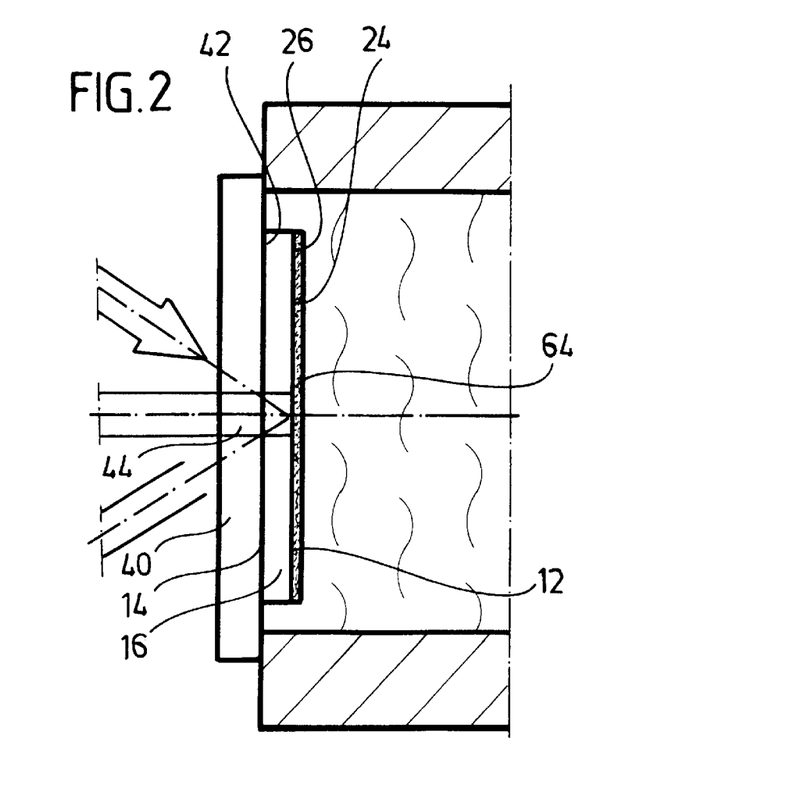
FIG. 2 shows an enlarged, sectional illustration of the area A in FIG. 1.

A first reflector 24 is, as illustrated in FIG. 2, arranged on the first flat side 12 of the solid-state member 10, for example, in the form of a coating 26 applied directly to the first flat side 12.

A second reflector 28 is formed by an external mirror 30 which is arranged on a side of the solid-state member 10 located opposite the first flat side 12 and faces the second flat side 14, wherein the external mirror 30 is designed, for example, as an, in particular, concave mirror forming the laser radiation field 20.

The excitation of the laser-active material of the solid-state member, at least within the partial volume 22, is brought about by a pumping radiation field 32 which is incident in the partial volume 22 inclined at an acute angle, for example, in relation to the laser radiation field 20 and is likewise reflected by the first reflector 24 in order to thus bring about a multiple passage of the pumping radiation field 32 through the partial volume 22.

The basic concept of such a laser amplifying system is described, for example, in European patent application 0 632 551 and so reference is made in full to the details in this publication with respect to the materials for the solid-state member and the laser-active material as well as the special conditions for operating such a laser.

Since the solid-state member 10 is mechanically unstable in the case of the inventive laser amplifying system, a support 40 with a stable shape is provided which has a support surface 42, on which the solid-state member 10 is supported areally with its second flat side.

In this respect, the support 40 is penetrated in a volume area 44 by the laser radiation field 20 and at least in this volume area, preferably as a whole, is formed from a material transparent for the laser radiation field 20 and, where applicable, also the pumping radiation field 32.

As a result of the areal support of the solid-state member with its second flat side 14 on the support surface 42, the solid-state member is held by the support 40 so as to be defined as to its shape, on the one hand, and, on the other hand, defined as to its position in the laser radiation field 20, wherein the support 40, for its part, can be securely positioned relative to the second reflector 28 via a holding device 46 so that, as a result, not only the solid-state member 10 but also the first reflector 24 are arranged in a defined position relative to the second reflector 28.

The holding device 46 comprises, for its part, a cooling device which is designated as a whole as 50 and comprises, for example, a cooling chamber 54 which is arranged in a holder housing 52 and in which a fluid cooling medium 56 is arranged which preferably flows through the cooling chamber 54 with a predetermined course 58.

In this respect, the holder housing 52 is expediently designed such that, proceeding from an opening 60 of the holder housing 52, a recess 62 extends into it and forms the cooling chamber 54, wherein the opening 60 is closed by the support 40 which is connected to the holder housing 52 in an outer edge area and thus closes the opening 60, wherein the solid-state member 10 which is securely arranged in relation to the support 40 is located within the opening 60 and on a side of the support 40 facing the cooling medium 56 and can, therefore, be cooled directly by the cooling medium 56 in the cooling chamber 54.

For this purpose, the coating 26 forming the first reflector 24 is preferably, as illustrated in FIG. 2, provided in addition with a cover layer 64 which is arranged on a side of the coating 26 facing away from the first flat side 12 and protects it against the action of the cooling medium 56, in particular, against mechanical and chemical interactions with the cooling medium 56.

In this respect, the course 58 of the flow in the cooling chamber 54 is preferably designed such that the cooling medium 56 flows directly against the cover layer 64 and is deflected by it so that in the area of the cover layer 64 as optimum a heat discharge as possible is possible as a result of the cooling medium 56.

Figure 3:
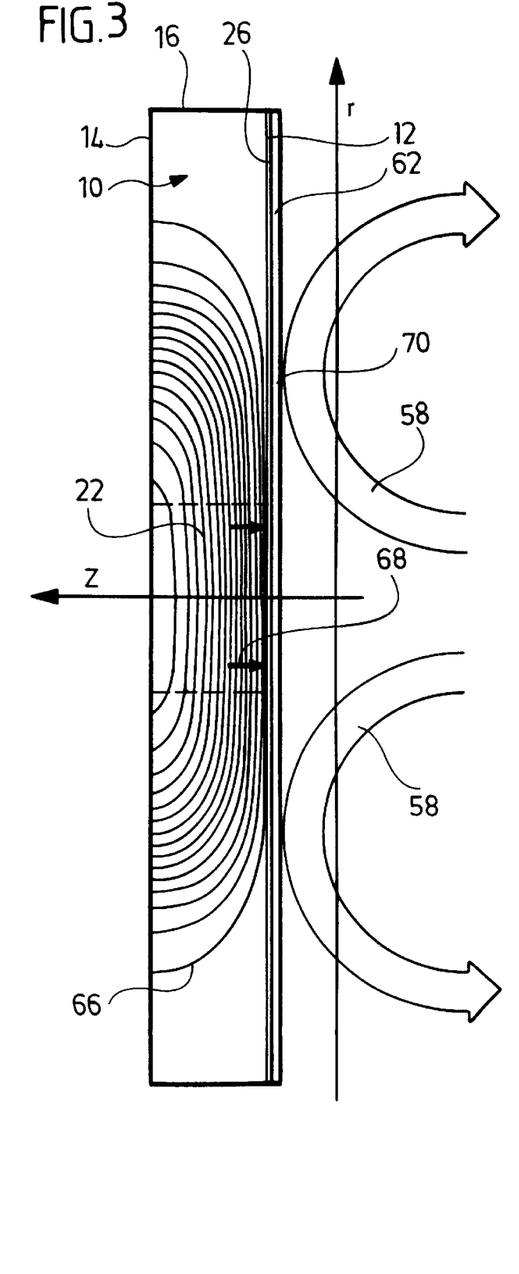
FIG. 3 shows a more enlarged illustration of the section similar to FIG. 2 through a solid-state member of the inventive laser amplifying system with illustration of isotherms.

As illustrated in FIG. 3, a temperature profile is therefore formed in the solid-state member 10, with which the isotherms 66 which are formed extend essentially parallel to the flat sides 12 and 14 within the partial volume 22 which is penetrated by the laser radiation field 20 and, therefore, a temperature gradient 68 extends essentially at right angles to the flat sides 12 and 14 so that a discharge of the heat generated by the pumping radiation field 32 in the solid-state member 10 is brought about transversely through the coating 26 and transversely through the cover layer 64, preferably in a direction essentially at right angles to the flat side 12, and the heat is transferred on a rear side 70 of the cover layer 64 facing away from the coating 26 to the cooling medium 56 flowing away from the rear side 70 which carries this heat away.

In conjunction with the first embodiment, no further details have been given concerning the connection between the solid-state member 10 and the support 40.

As illustrated in FIG. 2, the second flat side 14 abuts directly on the support surface 42 and, in this case, a connection between the support 40 and the solid-state member 10 is preferably provided by means of so-called bonding, i.e. by a rigid connection, which can be mechanically stressed, between two solid-state members without formation of an intermediate layer. For example, one possibility of such bonding is described in the article of "H. C. LEE, P. L. BROWNLIE, H. E. MEISSNER and E. C. REA: Diffusion bonded composites of YAG single crystals. SPIE Proceedings on Laser-Induced Damage in Optical Materials, October-November 1991, Boulder Colo., 1624, pgs. 2–12 (1991)".

Figure 4:
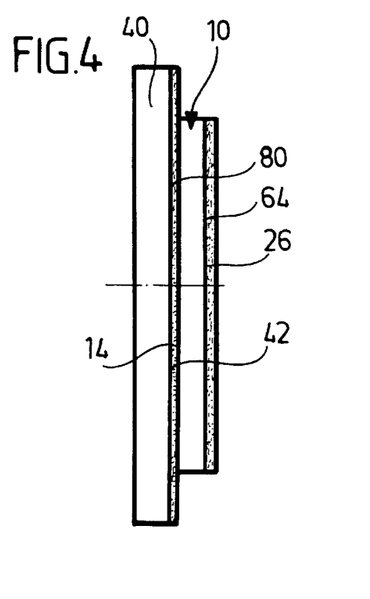
FIG. 4 shows a section similar to FIG. 2 through a second embodiment.

In a second embodiment of an inventive laser system, illustrated in FIG. 4, the support 40 and the solid-state member 10 are connected by a holding layer which is designated as a whole as 80 and is effective between the support surface 42 and the second flat side 14, wherein the holding layer 80 is transparent not only for the laser radiation field 20 and, where applicable, also the pumping radiation field 32 but has, in addition, an index of refraction $n_{80}$ which is selected such that a difference in the index of refraction between an index of refraction $n_{40}$ of the material of the support 40 and the index of refraction $n_{80}$ of the holding layer 80 as well as a difference in the index of refraction between the index of refraction $n_{10}$ of the solid-state member 10 and the index of refraction $n_{80}$ of the holding layer 80 is respectively smaller than $10^{-2}$ in order to obtain as little reflection as possible at the holding layer 80.

Figure 5:
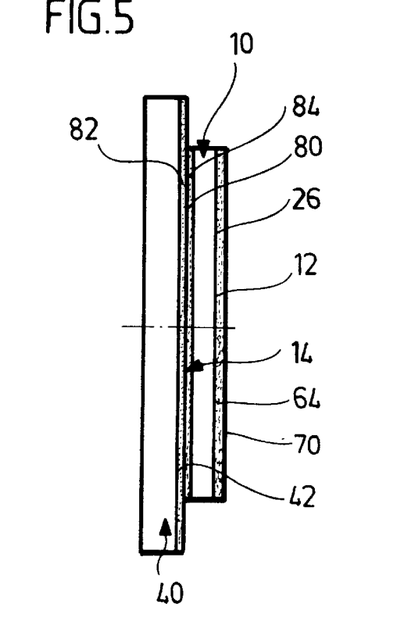
FIG. 5 shows a section similar to FIG. 2 through a third embodiment.

In a third embodiment, illustrated in FIG. 5, an antireflection layer 82 is preferably provided between the holding layer 80 and the support 40 and an antireflection layer 84 between the holding layer 80 and the solid-state member 10 in order to reduce reflections at the holding layer 80, wherein both antireflection layers 82 and 84 allow an optimum adaptation to the material of the holding layer 80.

The solid-state member 10 is, therefore, not areally supported directly on the support surface 42 in the case of both the second and the third embodiments but, in the case of the second embodiment, merely indirectly via the holding layer 80 and, in the case of the third embodiment, indirectly via the antireflection layers 82 and 84 and the holding layer 80 located therebetween.

As for the rest, the second and third embodiments are identical to the first embodiment and so reference can be made in full to the comments on the first embodiment with respect to the remaining features.

Figure 6:
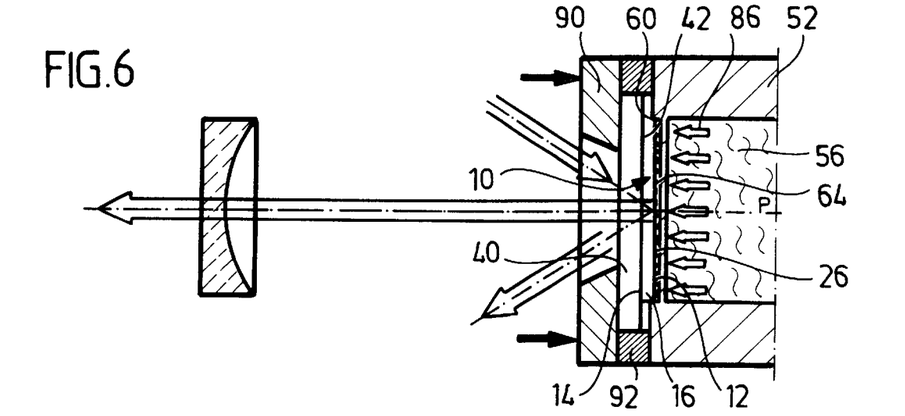
FIG. 6 shows a section similar to FIG. 1 through a fourth embodiment.

In a fourth embodiment, illustrated in FIG. 6, those elements which are identical to those of the preceding embodiments are given the same reference numerals and so reference can be made in full to the preceding embodiments with respect to their description.

In contrast to the first three embodiments, the solid-state member 10 in the fourth embodiment is merely abutted with its second flat side 14 on the support surface 42 but is not securely connected to it indirectly or directly by means effective between the solid-state member 10 and the support 40.

On the contrary, the solid-state member 10 is acted upon with pressure on the part of the cooling medium 26 subject to pressure in a direction 86 which is directed towards the support surface 42 and is essentially at right angles to the support surface 42 so that the cooling medium 56 subject to pressure is also used to abut the second flat side 14 areally on the support surface 42 and, therefore, support it on the support 40 and, therefore, to hold the solid-state member in a manner defined as to shape and position on account of the second flat side 14 interacting with the support surface 42.

This may be realized particularly favorably in the fourth embodiment illustrated in FIG. 6 due to the fact that the support 40 sealingly closes the opening 60 of the holder housing 52, for example, by way of a tight closure between an outer circumferential edge area and the holder housing 52, for example, an area thereof extending around the opening 60, as illustrated in FIG. 6.

For example, the support 40 is not held directly on the holder housing 52 but rather the support 40 is held, for its part, by a holding ring 90 and this is, in addition, supported on the holder housing 52 via thermally insulating intermediate members 92 so that essentially no cooling of the solid-state member 10 can take place via the support 40 on account of the thermal insulation in relation to the holder housing 52.

It is, however, also conceivable to act on the holding ring 90 by means of a clamping device which is not illustrated and generates a force in the direction of the holder housing 52 which is illustrated in FIG. 6 by the arrows.

Figure 7:
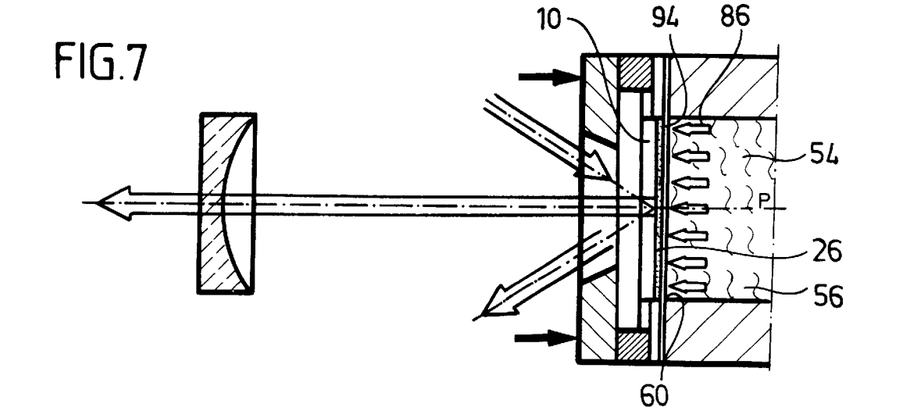
FIG. 7 shows a section similar to FIG. 1 through a fifth embodiment.

In a fifth embodiment, illustrated in FIG. 7, those elements which are identical to those of the fourth embodiment are given the same reference numerals and so with respect to their description reference can be made in full to the fourth embodiment as well as the preceding embodiments.

The fifth embodiment is based on the principle of the fourth embodiment but the cooling chamber 54 is closed by a membrane 94 in the area of its opening 60 and this membrane 94 acts, for its part, on the solid-state member 10, wherein, in this case, the coating 26 which represents the first reflector 24 does not need to be provided with the cover layer 64 in addition but can likewise be provided with the cover layer 64.

The membrane 94 is produced from a material which allows the membrane 94 to abut areally on the solid-state member 10, i.e., for example, on the coating 26 and act on the solid-state member 10 areally in the direction of the support surface 42 so that the solid-state member is held in a manner defined as to shape and position by the support 40 with the support surface 42 in the same way as that described in conjunction with the fourth embodiment.

The advantage of the membrane 94 in the fifth embodiment is to be seen in the fact that this ensures the sealing of the cooling chamber 54 against any flowing out of the cooling medium 56 in a simple manner and thus the cooling medium 56 can act on the solid-state member 10 with a correspondingly large pressure.

In a sixth embodiment, illustrated in FIG. 7, the positioning of the solid-state member 10 is brought about in the same way as in the fifth embodiment but with the difference that, in this case, the support surface 42 of the support 40 is designed as a convex surface and thus the solid-state member 10 is kept in abutment on the support 40 with a second flat side 14 which is, accordingly, concavely shaped.

In the case of the sixth embodiment, as well, the solid-state member 10 is held in abutment on the convex support surface 42 of the support 40 merely by the action of pressure on the part of the cooling medium 56 which acts on the membrane 94.

On account of the deformability of the membrane 94, this abuts over its entire area on the first flat side 12 which has a corresponding convex shape due to the concave design of the second flat side 14.

As for the rest, reference is made to the preceding embodiments insofar as the parts are identical to those of these embodiments.

Figure 8:
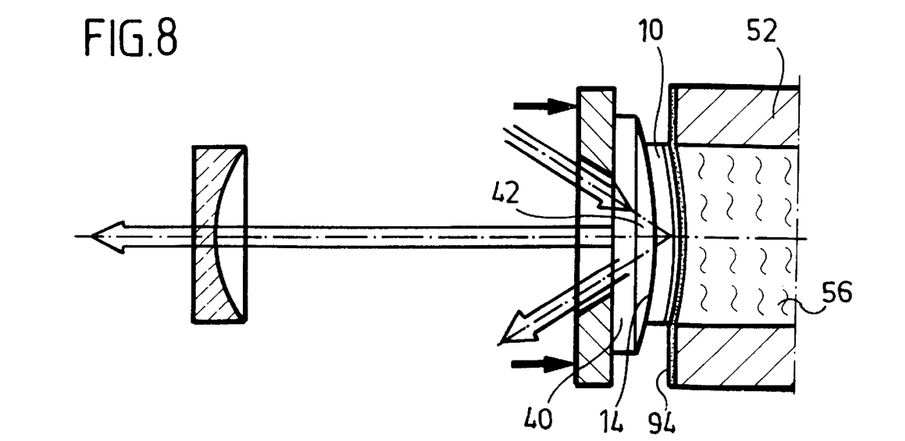
FIG. 8 shows a section similar to FIG. 1 through a sixth embodiment.

The advantage of the fourth, fifth and sixth embodiments is therefore to be seen in the fact that the cooling medium 56 subject to pressure acts on the solid-state member 10 essentially over its entire first flat side 12 with a constant pressure force in the direction of the support surface 42 and it is therefore possible to keep the solid-state member 10 in abutment on the support surface 42 with an essentially uniform pressure force, wherein the second flat side can be supported either directly on the support surface 42, as in the first embodiment, or indirectly by means of antireflection layers arranged, where applicable, between the support 40 and the solid-state member 10.

Figure 9:
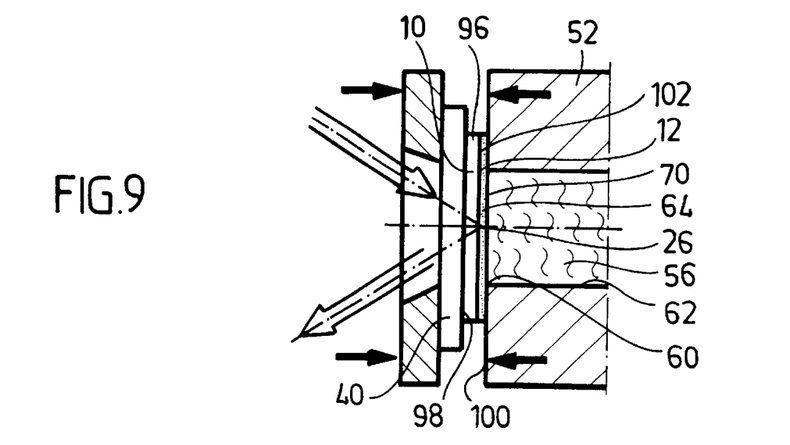
FIG. 9 shows a section similar to FIG. 1 through a seventh embodiment.

In a seventh embodiment, illustrated in FIG. 9, those parts which are identical to those of the preceding embodiments are given the same reference numerals and so with respect to their description reference can be made in full to the preceding embodiments.

In contrast to the preceding embodiments, the solid-state member 10 of the seventh embodiment is clamped in an outer area 96 between an outer area 98 of the support surface 42 and a clamping surface 100, for example, an end face of the holder housing 52, wherein the clamping surface 100 acts on an outer area 102 of the first flat side 12 indirectly or directly. In the case of indirect action, the entire first flat side is provided with the coating 26 and, where applicable, the cover layer 64 whereas in the case of direct action the coating 26 and the cover layer 64 do not extend into the outer area 102 of the first flat side 12.

Furthermore, the solid-state member 10 of the seventh embodiment covers the opening 60 of the recess 62 accommodating the cooling chamber 54 and therefore serves to seal the cooling chamber 54 in the area of the opening 60 so that the cooling medium 56 flows directly onto the rear side 70 of the cover layer 64 in order to draw off the heat in the manner described in conjunction with the preceding embodiments.

As a result of the solid-state member 10 being clamped between the clamping surface 100 and the outer area 98 of the support surface 42, the solid-state member 10 is abutted on the entire support surface 42 with the second flat side 14.

However, the force, with which the second flat side 14 abuts in the area of the partial volume 22 on the support surface 42 in the area of the volume area 44, is less than the force, with which the second flat side 14 abuts on the outer area 98 of the support surface 42 in the outer area 96.

Figure 10:
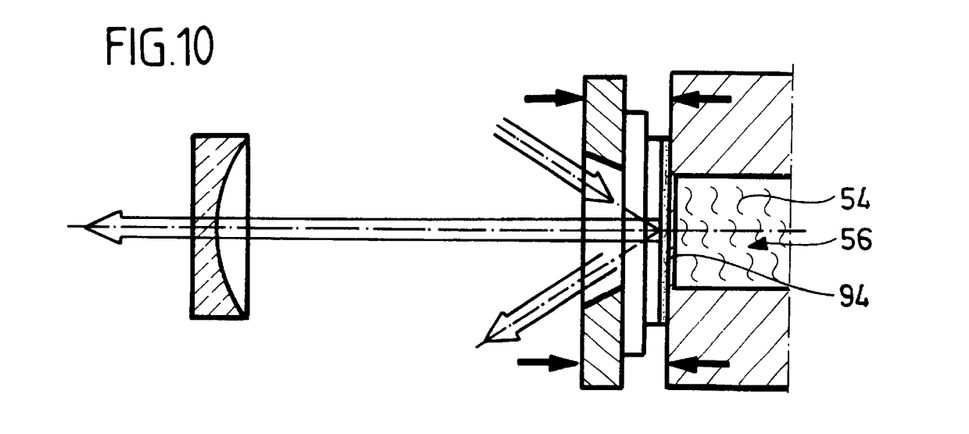
FIG. 10 shows a section similar to FIG. 1 through an eighth embodiment.

In an eighth embodiment, illustrated in FIG. 10, those elements which are identical to those of the preceding embodiments are given the same reference numerals and so reference is made in full to the explanations concerning these embodiments.

The eighth embodiment according to FIG. 10 is based on the fundamental principle of the seventh embodiment, wherein in the eighth embodiment, however, the solid-state member 10 does not close the opening 60 and therefore sealingly close the cooling chamber 54 with the fluid cooling medium 56 provided therein but rather the membrane 94 which has already been explained in conjunction with the fifth embodiment is used, in addition, for closing the cooling chamber 54.

The membrane 94 therefore allows the pressure of the cooling medium 56 to act on the solid-state member 10 in addition via the membrane 94 in order to abut this against the support surface 42.

Figure 11:
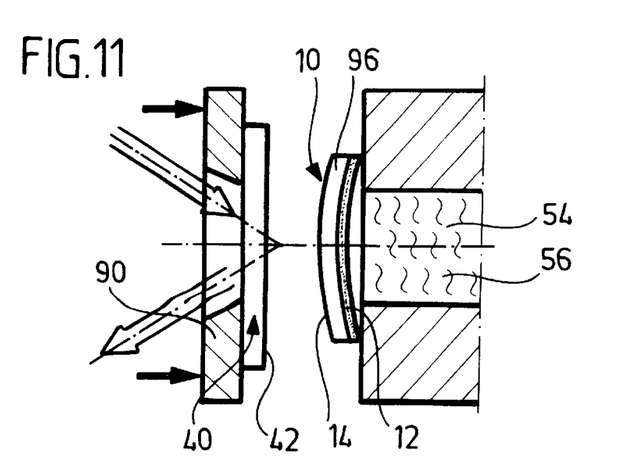
FIG. 11 shows a section similar to FIG. 1 through a ninth embodiment.

In a ninth embodiment, illustrated in FIG. 11, the same principle is used as in the seventh embodiment according to FIG. 9 but with the difference that the solid-state member 10 has a curved basic shape with a convex second flat side 14 so that when the solid-state member 10 is pressed due to action on it in its outer area 96 the solid-state member 10 itself abuts on the support surface 42 essentially over the entire second flat side 14 with essentially the same force since the solid-state member 10 generates inner tensions, which provide for an essentially uniform contact pressure of the second flat side 14 on the support surface 42, on account of its curved basic shape leading to the convex second flat side 14 when it is pressed against the plane support surface 42 and therefore on account of the deformation of the basic shape of the solid-state member 10 required as a result in such a manner that the second flat side 14 which is convex in the basic shape is pressed over its entire area against the plane support surface 42.

What is claimed is:

1. A laser amplifying system comprising:
   a solid-state member having flat sides located opposite one another and comprising a laser-active material,
   a laser radiation field passing through the solid-state member,
   a pumping radiation field pumping the laser-active material,
   a cooling device absorbing heat from the solid-state member via a first flat side by means of a fluid cooling medium flowing in it,
   a reflector for the laser radiation field arranged on the first flat side, and
   a support for the solid-state member, said support having the laser radiation field passing through it and being transparent for said field,
   the solid-state member being fixed areally on a support surface of the support by a connection effective between the support surface and the second flat side resulting from a bonding of the support and solid-state member and the solid state member being arranged so as to be defined in its shape and position essentially only via the support surface interacting with the second flat side.

2. A laser amplifying system as defined in claim 1, wherein the first flat side in the area penetrated by the laser radiation field is free from constraining forces predetermined by a surface inherently mechanically rigid.

3. A laser amplifying system comprising:
   a solid-state member having flat sides located opposite one another and comprising a laser-active material,
   a laser radiation field passing through the solid-state member,
   a pumping radiation field pumping the laser-active material,
   a cooling device absorbing heat from the solid-state member via a first flat side by means of a fluid cooling medium flowing in it,
   a reflector for the laser radiation field arranged on the first flat side,
   a support for the solid-state member, said support having the laser radiation field passing through it and being transparent for said field,
   the solid-siate member being supported areally on a support surface of the support with its second flat side and arranged so as to be defined in its shape and position essentially only via the support surface interacting with the second flat side, and
   the discharge of heat from the solid-state member to the fluid cooling medium taking place exclusively via layers consisting of dimensionally flexible materials applied to the solid state member.

4. A laser amplifying system as defined in claim 3, wherein the solid-state member is fixed on the support.

5. A laser amplifying system as defined in claim 3, wherein the solid-state member is fixed on the support by a connection effective between the support surface and the second flat side.

6. A laser amplifying system as defined in claim 3, wherein the connection between the support surface and the second flat side has resulted due to bonding of the support and solid-state member.

7. A laser amplifying system comprising:
   a solid-state member having flat sides located opposite one another and comprising a laser-active material,
   a laser radiation field passing through the solid-state member,
   a pumping radiation field pumping the laser-active material,
   a cooling device absorbing heat from the solid-state member via a first flat side by means of a fluid cooling medium flowing in it,
   a reflector for the laser radiation field arranged on the first flat side,
   a support for the solid-state member, said support having the laser radiation field passing through it and being transparent for said field,
   the solid-state member being fixed areally on a support surface of the support by a connection effective between the support surface and the second flat side and the solid state member being arranged so as to be defined in its shape and position essentially only via the support surface interacting with the second flat side, and
   the connection between the support surface and the second flat side being brought about by means of a holding layer.

8. A laser amplifying system as defined in claim 7, wherein the holding layer is adapted with respect to its index of refraction to the index of refraction of the solid-state member.

9. A laser amplifying system as defined in claim 8, wherein a difference in the respective index of refraction of less than $10^{-2}$ exists between the holding layer and the support and/or the holding layer and the solid-state member.

10. A laser amplifying system as defined in claim 7, wherein an antireflection layer is provided between the holding layer and the support.

11. A laser amplifying system as defined in claim 7, wherein an antireflection layer is provided between the holding layer and the solid-state member.

12. A laser amplifying system as defined in claim 3, wherein the solid-state member and the support are fixed in a force-locking manner in the area of the support surface and the second flat side as a result of a pressure acting on the solid-state member in the direction of the support.

13. A laser amplifying system as defined in claim 12, wherein the solid-state member is acted upon with a force in the direction of the support by way of the cooling medium.

14. A laser amplifying system as defined in claim 12, wherein the solid-state member is acted upon with a force in the direction of the support in sections.

15. A laser amplifying system as defined in claim 12, wherein the solid-state member is acted upon with a force in the direction of the support in an outer area located outside the laser radiation field.

16. A laser amplifying system as defined in claim 12, wherein the solid-state member acts on the support with essentially the same force at every point with the area of the second flat side bordering on the partial volume penetrated by the laser radiation field.

17. A laser amplifying system as defined in claim 12, wherein the solid state member abutting on the support surface with the second flat side acts on the support at least with the area of the second support surface bordering on the partial volume penetrated by the laser radiation field on account of inner tension.

18. A laser amplifying system as defined in claim 17, wherein the second flat side has a convex curvature prior to it abutting on the support surface.

19. A laser amplifying system as defined in claim 1, wherein the temperature at the second flat side is higher than at the first flat side in the areas of the first and second flat sides penetrated by the laser radiation field.

20. A laser amplifying system comprising:
a solid-state member having flat sides located opposite one another and comprising a laser-active material,
a laser radiation field passing through the solid-state member,
a pumping radiation field pumping the laser-active material,
a cooling device absorbing heat from the solid-state member via a first flat side by means of a fluid cooling medium flowing in it,
a reflector for the laser radiation field arranged on the first flat side,
a support for the solid-state member, said support having the laser radiation field passing through it and being transparent for said field,
the solid-state member being supported areally on a support surface of the support with its second flat side and arranged so as to be defined in its shape and position essentially only via the support surface interacting with the second flat side, and
the solid-state member having a temperature gradient extending essentially exclusively transversely to the flat sides in the volume area penetrated by the laser radiation field.

21. A laser amplifying system comprising:
a solid-state member having flat sides located opposite one another and comprising a laser-active material,
a laser radiation field passing through the solid-state member,
a pumping radiation field pumping the laser-active material,
a cooling device absorbing heat from the solid-state member via a first flat side by means of a fluid cooling medium flowing in it,
a reflector for the laser radiation field arranged on the first flat side
a support for the solid-state member, said support having the laser radiation field passing through it and being transparent for said field,
the solid-state member being supported areally on a support surface of the support with its second flat side and arranged so as to be defined in its shape and position essentially only via the support surface interacting with the second flat side, and
the solid-state member being essentially free from any temperature gradient in the volume area penetrated by the laser radiation field in the direction of a surface extension of the flat sides.

22. A laser amplifying system comprising:
a solid-state member having flat sides located opposite one another and comprising a laser-active material,
a laser radiation field passing through the solid-state member,
a pumping radiation field pumping the laser-active material,
a cooling device absorbing heat from the solid-state member via a first flat side by means of a fluid cooling medium flowing in it,
a reflector for the laser radiation field arranged on the first flat side,
a support for the solid-state member, said support having the laser radiation field passing through it and being transparent for said field,
the solid-state member being supported areally on a support surface of the support with its second flat side and arranged so as to be defined in its shape and position essentially only via the support surface interacting with the second flat side, and
an altogether negative temperature gradient occurring in the solid-state member in a direction extending transversely to the flat sides and extending from the second flat side to the first flat side.

23. A laser amplifying system as defined in claim 1, wherein the discharge of heat from the solid-state member takes place via a layer system comprising at least one layer applied to the solid-state member.

24. A laser amplifying system as defined in claim 23, wherein the layer system is acted upon directly by the fluid cooling medium on a side located opposite the first flat side.

25. A laser amplifying system comprising:
a solid-state member having flat sides located opposite one another and comprising a laser-active material,
a laser radiation field passing through the solid-state member,
a pumping radiation field pumping the laser-active material,
a cooling device absorbing heat from the solid-state member via a first flat side by means of a fluid cooling medium flowing in it,
a reflector for the laser radiation field arranged on the first flat side,
a support for the solid-state member, said support having the laser radiation field passing through it and being transparent for said field,
the solid-state member being supported areally on a support surface of the support with its second flat side and arranged so as to be defined in its shape and position essentially only via the support surface interacting with the second flat side, the discharge of heat from the solid-state member taking place via a layer system comprising at least one layer applied to the solid-state member, and the at least one layer having altogether a heat resistance of at the most $$8 \frac{K \text{ mm}^2}{W}.$$

26. A laser amplifying system as defined in claim 19, wherein the heat discharge is brought about by the cooling device via a cover layer borne by a reflector layer, said cover layer being acted upon by the fluid cooling medium on a side facing away from the solid-state member.

27. A laser amplifying system comprising:
- a solid-state member having flat sides located opposite one another and comprising a laser-active material,
- a laser radiation field passing through the solid-state member,
- a pumping radiation field pumping the laser-active material,
- a cooling device absorbing heat from the solid-state member via a first flat side by means of a fluid cooling medium flowing in it,
- a reflector for the laser radiation field arranged on the first flat side,
- a support for the solid-state member, said support having the laser radiation field passing through it and being transparent for said field,
- the solid-state member being supported areally on a support surface of the support with its second flat side and arranged so as to be defined in its shape and position essentially only via the support surface interacting with the second flat side,
- the discharge of heat from the solid-state member taking place via a layer system comprising at least one layer applied to the solid-state member,
- the heat discharge being brought about by the cooling device via a cover layer borne by a reflector layer, said cover layer being acted upon by the fluid cooling medium on a side facing away from the solid-state member, and
- the cover layer representing a protective layer for the reflector layer against action of the cooling medium.

28. A laser amplifying system comprising:
- a solid-state member having flat sides located opposite one another and comprising a laser-active material,
- a laser radiation field passing through the solid-state member,
- a pumping radiation field pumping the laser-active material,
- a cooling device absorbing heat from the solid-state member via a first flat side by means of a fluid cooling medium flowing in it,
- a reflector for the laser radiation field arranged on the first flat side,
- a support for the solid-state member, said support having the laser radiation field passing through it and being transparent for said field,
- the solid-state member being supported areally on a support surface of the support with its second flat side and arranged so as to be defined in its shape and position essentially only via the support surface interacting with the second flat side,
- the discharge of heat from the solid-state member taking place via a layer system comprising at least one layer applied to the solid-state member,
- the heat discharge being brought about by the cooling device via a cover layer borne by a reflector layer, said cover layer being acted upon by the fluid cooling medium on a side facing away from the solid-state member, and
- no shape-defining action on the solid-state member taking place via the cover layer.

29. A laser amplifying system comprising:
- a solid-state member having flat sides located opposite one another and comprising a laser-active material,
- a laser radiation field passing through the solid-state member,
- a pumping radiation field pumping the laser-active material,
- a cooling device absorbing heat from the solid-state member via a first flat side by means of a fluid cooling medium flowing in it,
- a reflector for the laser radiation field arranged on the first flat side,
- a support for the solid-state member, said support having the laser radiation field passing through it and being transparent for said field,
- the solid-state member being supported areally on a support surface of the support with its second flat side and arranged so as to be defined in its shape and position essentially only via the support surface interacting with the second flat side,
- the discharge of heat from the solid-state member raking place via a layer system comprising at least one layer applied to the solid-state member,
- the heat discharge being brought about by the cooling device via a cover layer borne by a reflector layer, said cover layer being acted upon by the fluid cooling medium on a side facing away from the solid-state member, and
- the cover layer being designed as a flexible layer.

30. A laser amplifying comprising:
- a solid-state member having flat sides located opposite one another and comprising a laser-active material,
- a laser radiation field passing through the solid-state member,
- a pumping radiation field pumping the laser-active material,
- a cooling device absorbing heat from the solid-state member via a first flat side by means of a fluid cooling medium flowing in it,
- a reflector for the laser radiation field arranged on the first flat side,
- a support for the solid-state member, said support having the laser radiation field passing through it and being transparent for said field,
- the solid-state member being supported areally on a support surface of the support with its second flat side and arranged so as to be defined in its shape and position essentially only via the support surface interacting with the second flat side,
- the discharge of heat from the solid-state member taking place via a layer system comprising at least one layer applied to the solid-state member,
- the heat discharge being brought about by the cooling device via a cover layer borne by a reflector layer, said cover layer being acted upon by the fluid cooling medium on a side facing away from the solid-state member, and the cover layer being designed as a layer adapting in shape to the shape of the solid-state member.

31. A laser amplifying system as defined in claim 23, wherein the layer system comprises a membrane acted upon by the fluid cooling medium on its side facing away from the solid-state member.

32. A laser amplifying system as defined in claim 23, wherein with the layer system the solid-state member limits a cooling chamber guiding the cooling medium.

33. A laser amplifying system as defined in claim 32, wherein the cooling chamber for the cooling medium is arranged in a holder housing.

34. A laser amplifying system comprising:

a solid-state member having flat sides located opposite one another and comprising a laser-active material, a laser radiation field passing through the solid-state member, a pumping radiation field pumping the laser-active material, a cooling device absorbing heat from the solid-state member via a first flat side by means of a fluid cooling medium flowing in it, a reflector for the laser radiation field arranged on the first flat side, a support for the solid-state member, said support having the laser radiation field passing through it and being transparent for said field, the solid-state member being supported areally on a support surface of the support with its second flat side and arranged so as to be defined in its shape and position essentially only via the support surface interacting with the second flat side, the discharge of heat from the solid-state member taking place via a layer system comprising at least one layer applied to the solid-state member, the layer system of the solid-state member limiting a cooling chamber guiding the cooling medium, the cooling chamber for the cooling medium being arranged in a holder housing, and the support closing an opening in the holder housing with the solid-state member.

35. A laser amplifying system comprising:

a solid-state member having flat sides located opposite one another and comprising a laser-active material, a laser radiation field passing through the solid-state member, a pumping radiation field pumping the laser-active material, a cooling device absorbing heat from the solid-state member via a first flat side by means of a fluid cooling medium flowing in it, a reflector for the laser radiation field arranged on the first flat side, a support for the solid-state member, said support having the laser radiation field passing through it and being transparent for said field, the solid-state member being supported areally on a support surface of the support with its second flat side and arranged so as to be defined in its shape and position essentially only via the support surface interacting with the second flat side, and the support being formed from a material with a heat conductivity of less than $$2\frac{W}{m \times K}.$$

36. A laser amplifying system comprising:

a solid-state member having flat sides located opposite one another and comprising a laser-active material, a laser radiation field passing through the solid-state member, a pumping radiation field pumping the laser-active material, a cooling device absorbing heat from the solid-state member via a first flat side by means of a fluid cooling medium flowing in it, a reflector for the laser radiation field arranged on the first flat side, a support for the solid-state member, said support having the laser radiation field passing through it and being transparent for said field, the solid-state member being supported areally on a support surface of the support with its second flat side and arranged so as to be defined in its shape and position essentially only via the support surface interacting with the second flat side, and the support being formed from an athermal optical material.

37. A laser amplifying system comprising:

a solid-state member having flat sides located opposite one another and comprising a laser-active material, a laser radiation field passing through the solid-state member, a pumping radiation field pumping the laser-active material, a cooling device absorbing heat from the solid-state member via a first flat side by means of a fluid cooling medium flowing in it, a reflector for the laser radiation field arranged on the first flat side, a support for the solid-state member, said support having the laser radiation field passing through it and being transparent for said field, the solid-state member being supported areally on a support surface of the support with its second flat side and arranged so as to be defined in its shape and position essentially only via the support surface interacting with the second flat side, and the support being insulated thermally in relation to the cooling device.

38. A laser amplifying comprising:

a solid-state member having flat sides located opposite one another and comprising a laser-active material, a laser radiation field passing through the solid-state member, a pumping radiation field pumping the laser-active material, a cooling device absorbing heat from the solid-state member via a first flat side by means of a fluid cooling medium flowing in it, a reflector for the laser radiation field arranged on the first flat side, a support for the solid-state member, said support having the laser radiation field passing through it and being transparent for said field, the solid-state member being supported areally on a support surface of the support with its second flat side and arranged so as to be defined in its shape and position essentially only via the support surface interacting with the second flat side, and the support and the solid-state member having similar materials forming a crystal grating.

39. A laser amplifying system as defined in claim 1, wherein the flat sides of the solid-state member are polished so as to be plane-parallel.

40. A laser amplifying system as defined in claim 1, wherein the first flat side and a front face of the support located opposite the support surface are polished so as to be plane-parallel to one another.

* * * * *

UNITED STATES PATENT AND TRADEMARK OFFICE
CERTIFICATE OF CORRECTION

PATENT NO. : 6,747,789 B2
DATED : June 8, 2004
INVENTOR(S) : Huonker et al.

It is certified that error appears in the above-identified patent and that said Letters Patent is hereby corrected as shown below:

<u>Column 12,</u>
Line 9, correct "solid-siate" to read -- solid-state --.

<u>Column 16,</u>
Line 31, correct "raking" to read -- taking --.

Signed and Sealed this

Thirty-first Day of August, 2004

JON W. DUDAS
*Director of the United States Patent and Trademark Office*